Jan. 3, 1967    R. L. STOUT ETAL    3,295,828
TIRE SPREADER
Filed Oct. 11, 1965

United States Patent Office 3,295,828
Patented Jan. 3, 1967

3,295,828
TIRE SPREADER
Richard L. Stout, Box 186, Provo, Utah; Jerald L. Johnson, 389 East 720 South, and La Nar J. Spendlove, 708 East 400 North, both of Orem, Utah
Filed Oct. 11, 1965, Ser. No. 494,817
9 Claims. (Cl. 254—50.3)

The present invention relates to a tire spreader and more particularly to one which has a base made of deck plate or the like having tread supporting means and means including upright bars with hooks at the upper ends to engage the beads of a tire resting on the supports and spread the beads apart when at least one of said bars is moved away from the other under the force of a fluid motor.

The art of tire spreaders is a crowded one and the many proposed devices have not fully satisfactory because of complexity in the framework, or in the spreading mechanism, or both which has greatly increased the cost, or they have relied on hand operated linkage mechanisms, or they have been too heavy to be readily portable.

Figure 1:
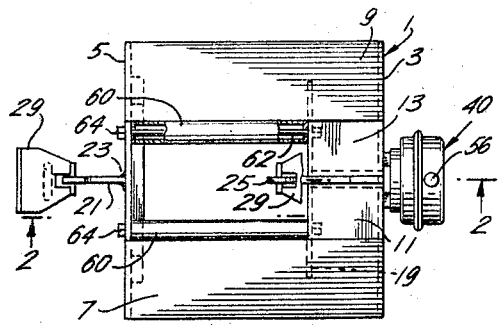
Figure 2:
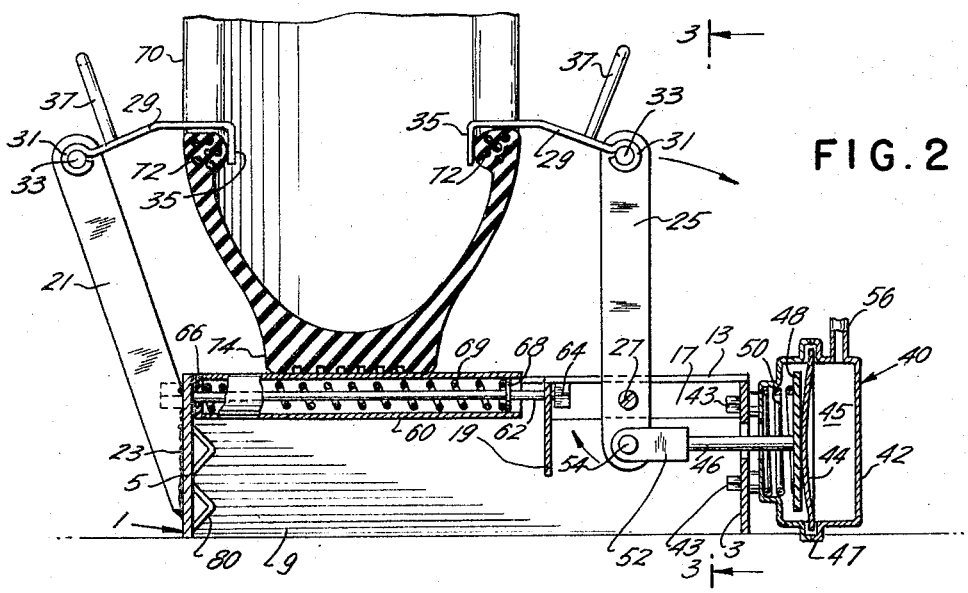
Figure 3:
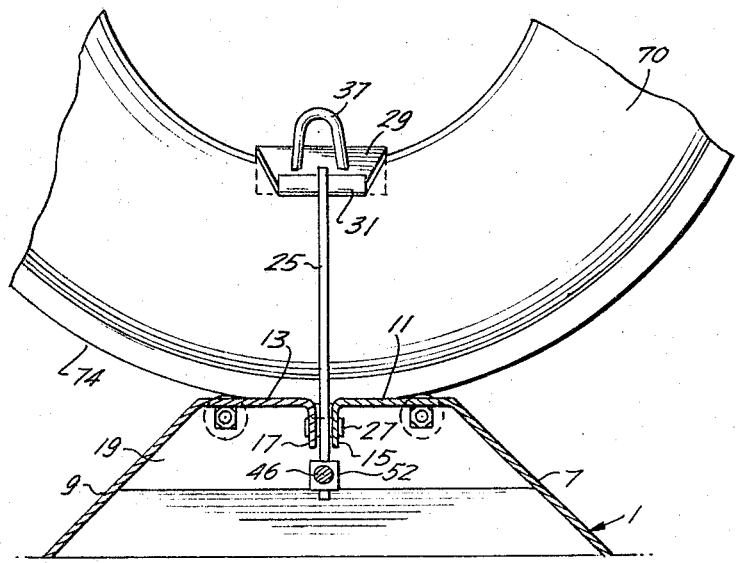

The present invention avoids the disadvantages of the prior art and provides a tire spreader that is light in weight so that it can easily be moved from place to place, simple an inexpensive to manufacture and use and which functions easily with only a pneumatic or compressed air line to actuate the fluid motor that drives the moving parts. The invention will be described and illustrated in conjunction with the drawings in which:

FIG. 1 is a top plan view of the device of the invention with parts of one roller broken away to show the structure, FIG. 2 is a vertical sectional view on a larger scale of the device of FIG. 1 along the line 2—2 looking in the direction of the arrows and showing an alternate roller construction, and FIG. 3 is a vertical sectional view of the device along the line 3—3 of FIG. 2 looking in the direction of the arrow.

Referring now to the drawings, the tire spreader comprises a base 1 having a first end plate 3 having top, bottom and side edges, a second end plate 5 likewise having top, bottom and side edges, a first side plate 7 having top, bottom and side edges secured at its side edges to a side edge of each of said end plates 3 an 5, and a second side plate 9 likewise having top, bottom and side edges secured at its side edges to the other side edge of each of said end plates opposite said first side plate 7 to form an open bottom frame adapted to rest on a support such as a garage floor or bench. Preferably the end plates are trapezoidal in shape as shown with the long edge at the bottom to give greater stability and place the side plates on a slope to assist in raising the tire to the top of the base.

The end plates and side plates may be made of any suitable material but it has been found advantageous to make them of deck plate which can be cut readily to shape, either as a single blank for the whole base with the two ends welded together, or each piece may be cut separately and secured to the others, e.g., by welding. A top wall is also provided, preferably only a partial wall which extends from the first end plate only a relatively short distance toward the second end plate so that the top is open for a purpose to be described later. The top wall is preferably made by providing an extension 11 on side plate 7 and a similar extension 13 on side plate 9. The adjacent ends of these extensions 11 and 13 are turned down to form flanges 15 and 17, respectively as seen in FIG. 3 to form a slot between them. A web 19 is secured, e.g., by welding, to the side plates 7 and 9 and to the end of the top plates 11 and 13 remote from the end plate 3 and the other end of the top plates is similarly secured to the end plate 3. This gives a rigid, sturdy base that withstands very well the stresses to which it is subjected in use and can be manufactured readily and at low cost.

A first bar 21 is secured to the exposed surface of end plate 5, e.g., by welding 23. A second bar 25 is pivoted intermediate its ends by a pin 27 mounted in aligned holes in the flanges 15 and 17, as seen in FIG. 3.

A gripper 29 is provided at the upper end of each of said bars 21 and 25. Preferably it is made of a metal plate having a bifurcated end to receive a pin passing through a suitable hole in the bar which the bifurcated end straddles. A suitable structure comprises a roll 31 at the end of each of the bifurcated ends which forms a hinge tube around a hinge pin 33 in the bar. At the other end of the plate is a hook 35 which may be formed by bending the end downwardly. A loop handle 37 is preferably provided to facilitate the movement of the gripper about the hinge pin to engage and disengage the hook with the bead of of a tire placed on the base for spreading.

A fluid motor 40 is provided to move the bars 21 and 25 away from each other at the top to spread the beads of the tire. A preferred form is an air can comprising a casing 42 fastened to the end plate 3 by bolts 43. A diaphragm 44 is suitably mounted in the casing to provide a pressure chamber 45 on one side thereof, e.g., by making the casing in two parts with flanges to engage the periphery of the diaphragm and clamp it there by a channel member 47, as seen in FIG. 2. A connecting rod 46 is provided with a pressure plate 48 on the end adjacent to the diaphragm 44 and it passes through aligned holes in the casing 42 and the end plate 3 toward the lower end of the bar 25. A spring 50 may be compressed between the pressure plate 40 and the casing 42 to return the parts to normal position when fluid pressure is released.

The connection between the connecting rod 46 and the lower end of bar 25 may be made through a shackle 52 secured to the end of the rod 46 and pivoted to bar 25 by a pin 54 which passes through aligned holes in the two arms of the shackle and the bar 25. An air tube 56 is provided for the pressure chamber 45 which is adapted to fit the air nozzle of the customary air line used for inflating tires.

Means for providing spaced supports for the tread of a tire are located at the upper edges of the side plates adjacent to the end plate 5. While this support could be the top edge of the side plates it is preferable to provide rollers that make it easier to rotate the tire to inspect it as it is spread from place to place. In the form shown in FIG. 1 the rollers 60 each comprise an axle 62 sufficiently long to pass through aligned holes in the end plate 5 and the web 19 and the axles may be threaded at the ends to cooperate with nuts 64 to hold the axles in place. Fixed annuli are secured in each end of the tube to rotate freely on the axle.

In the roller embodiment of FIG. 2 a first annulus 66 is secured to one end of the tube or cylinder 60 and is slidable along and rotatable about the axle. A second annulus 68 is secured to the axle and it is slidable in and rotatable with respect to the tube 60 adjacent to its other end. A compression spring 69 biases the annuli apart. Looking at FIG. 2 it will be seen that the roller 60 can move to the right as the tire is spread and the tread so moves.

In operation a tire 70 is placed on the supports 60 as shown in FIGS. 2 and 3. The grippers 29 are then turned to the position shown in FIG. 2 so that the hooks engage the beads. The beads 72 are then pulled apart by filling the pressure chamber 45 with compressed air through tube 56 from the customary air line. This causes the diaphragm 44 and pressure plate 48 to force the connecting rod 46 to the left, thus swinging the lower end of bar 25 clockwise as shown by the arrow. The other end of the bar 25 is thus moved away from the upper end of bar 21 and increasing the distance from the hook on 21 to the hook on 25. This movement of the right bead while the left bead remains stationary causes the tread to move about half as far as the right bead moves. While the tread will slip along a roller that has no lateral movement, it is preferable to use the roller structure of FIG. 3 which permits the roller to move with the tread both to the right when the tire is spread and to the left when the tire returns to normal spread between the beads. After inspection of the spread portion at one location, the air pressure is released, the parts return to normal, the tire may be rotated to an adjacent location, again spread and the inspection continued until the entire tire has been inspected. Then the gippers 29 are lifted by the loop handles 37 from the beads and rotated about 180° to be out of the way when the next tire is placed on the base for inspection.

FIG. 2 shows how the end plate 5 may be reinforced by welding angle irons 80 to the inner surface thereof if it is desired to make the base of relatively light plate, which is desirable to reduce cost and weight and make the device more readily portable.

While the invention has been described and illustrated in conjunction with specific embodiments which represent the best embodiments now known, it is obvious that modifications and variations may be made without departing from the spirit and scope of the invention as defined in the following claims.

Having thus described the invention, what is claimed is:
1. A tire spreader comprising:
  (a) a base having:
    (1) a first end plate having top, bottom and side edges,
    (2) a second end plate having top, bottom and side edges,
    (3) a first side plate having top, bottom and side edges secured at its side edges to a side edge of each end plate,
    (4) a second side plate having top, bottom and side edges secured at its side edges to the other side edge of each of said end plates opposite said first side plate to form an open bottom frame adapted to rest on a support,
    (5) means providing spaced supports for the tread of a tire adjacent to the top edges of said side plates and to said second end plate,
    (6) a top plate secured to the top edge of the first end plate and along the top edges of the side plates having a slot parallel to said side plates adjacent to said first end plate,
  (b) a first bar secured to the exposed surface of said second end plate and extending a substantial distance above it,
  (c) a second bar in said slot pivoted intermediate its ends to said top plate and extending a substantial distance above it, said bar being movable in said slot toward and away from said first bar,
  (d) a fluid motor having a casing and a reciprocable connecting rod, said casing being mounted on said first end plate and said connecting rod being connected to said second bar below the pivot whereby the power thrust of said connecting rod moves the upper end of said second bar away from said first bar, and
  (e) a gripper pivoted to the upper end of each bar having a hook adapted to engage the bead of a tire placed on said base with the tread engaging said supports and to spread the beads when the fluid motor is actuated.

2. A tire spreader as set forth in claim 1 in which said top plate is short relative to the length of the side plates and a web is secured to the side plates and to the end of the top plate remote from said first end plate.

3. A tire spreader as set forth in claim 2 in which the tire support means includes rollers rotatably mounted between said web and said second end plate adjacent to said side plates.

4. A tire spreader as set forth in claim 3 in which said rollers include an axle, a cylinder, a first annulus secured to said cylinder at one end thereof adjacent to said second end plate and slidable along said axle, a second annulus slidable in said cylinder secured to said axle adjacent to the other end of said roller, and a compression spring biasing said annuli apart.

5. A tire spreader as set forth in claim 1 in which said gripper is a metal plate having a bifurcated end to receive said bar and engage a pin passing through said bar on each side thereof, a downwardly bent other end to form said hook and a loop handle between the ends to facilitate moving said gripper to and from bead engaging position.

6. A tire spreader as set forth in claim 1 in which said fluid motor is an air can having a diaphragm forming a pressure chamber on one side thereof, the connecting rod has a pressure plate at the end engaging the diaphragm and a spring is interposed between the casing and the pressure plate.

7. A tire spreader as set forth in claim 1 in which said end plates are trapezoidal with the long edge at the bottom whereby the side plates form a ramp to assist placing the tire on the supports.

8. A tire spreader as set forth in claim 1 in which said second end plate is reinforced with angle bars welded to the inner surface.

9. A roller for a tire spreader comprising an axle, a cylinder surrounding a portion of the axle, a first annulus secured to one end of said cylinder and slidable on said axle, a second annulus secured to said axle slidable in said cylinder adjacent to the other end thereof, and a compression spring between said annuli biasing them apart.

References Cited by the Examiner

UNITED STATES PATENTS

| | | | |
|---|---|---|---|
| 2,446,211 | 8/1948 | Clark | 29—126 X |
| 2,611,258 | 9/1952 | Greaves. | |
| 2,821,361 | 1/1958 | Marks | 254—50.3 |
| 3,000,615 | 9/1961 | Alm | 254—50.3 |
| 3,097,825 | 7/1963 | Ruhland | 254—50.3 |

WILLIAM FELDMAN, *Primary Examiner.*

MILTON S. MEHR, *Examiner.*